March 1, 1932. J. A. SPENCER 1,848,031
VALVE
Filed May 31, 1930 2 Sheets-Sheet 1

John A. Spencer, INVENTOR.

ATTORNEY.

March 1, 1932.  J. A. SPENCER  1,848,031
VALVE
Filed May 31, 1930  2 Sheets-Sheet 2

John A. Spencer, INVENTOR.

ATTORNEY.

Patented Mar. 1, 1932

1,848,031

UNITED STATES PATENT OFFICE

JOHN A. SPENCER, OF NEWTON, MASSACHUSETTS, ASSIGNOR TO THE SPENCER THERMO-
STAT COMPANY, OF NEWTON, MASSACHUSETTS, A CORPORATION OF MASSACHU-
SETTS

VALVE

Application filed May 31, 1930. Serial No. 457,756.

The present invention relates to a valve for use in pipe lines, and more especially the invention relates to a valve which will automatically control the flow of fluid through the line in which the valve is installed, the automatic operation of the valve being effected by temperature variations of predetermined ranges in the fluid passing through the valve.

More specifically, the invention deals with the construction of a valve assembly wherein there is provided a main valve member and an auxiliary valve member, the latter being thermostatically operated, the operation of this auxiliary valve member causing the operation of the main valve. A convenient construction is to make the main valve head and main valve hollow, and to position the auxiliary valve within the main valve head, seating the closing member of the auxiliary valve upon the opening in the main valve stem, so as to automatically open and close the passage in the main valve stem, the closing member of the main valve seating upon a port in a partition dividing the valve casing, flow of fluid through the casing being controlled by the opening and closing of this port.

Figure 1:
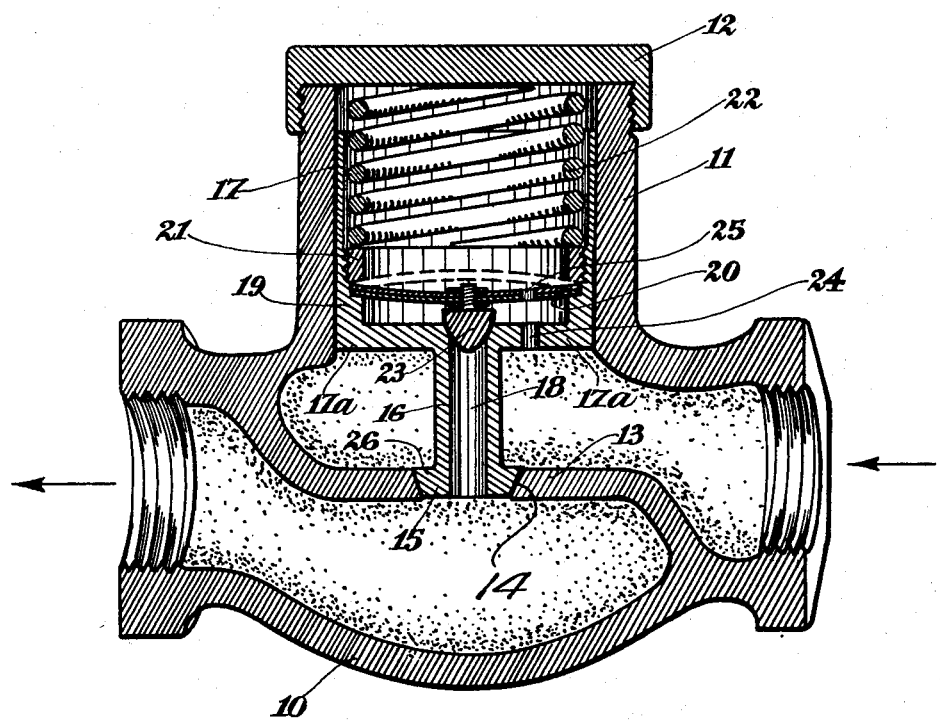
Figure 2:
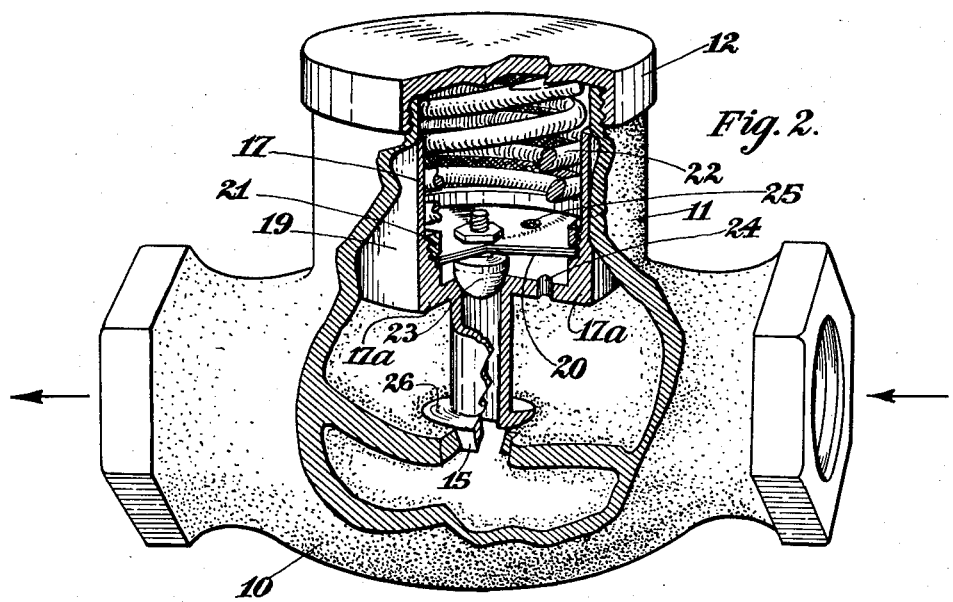
Figure 3:
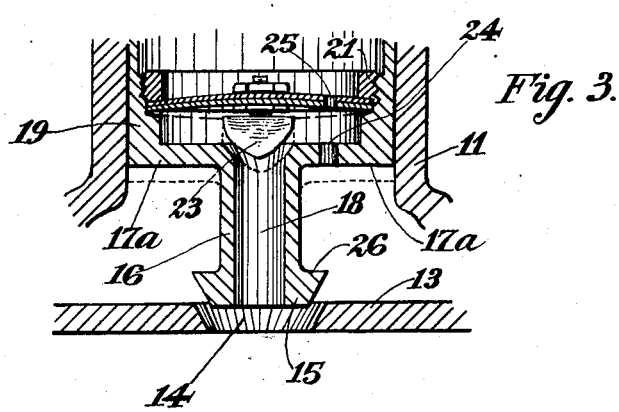

The invention will be more readily understood by reference to the accompanying drawings in which Figure 1 represents a longitudinal section through the valve;

Figure 2 represents a side elevation of the valve, parts being broken away for clarity, and Figure 3 is a detail view of the main and auxiliary valve members.

Referring more particularly to the drawings, numeral 10 represents a valve casing, a portion 11 of which forms a housing for certain of the valve elements, the housing 11 being closed by a removable cap 12. The casing 10 is divided diagonally by the partition 13 provided by a port 14 through which fluid flows on its passage through the valve. This port is opened and closed by the action of the main valve.

The main valve, as shown, is composed of the closing member 15, the stem 16, and the hollow head 17, this head serving as a piston, sliding back and forth in the housing 11, the inner surface of which the head 17 slidingly engages. The members 15, 16, and 17, forming the main valve element, are formed as a unitary structure, and the stem 16 has a passage 18 extending through it, the passage 18 communicating between the interior of the head 17 and the port 14.

The head 17 has a shoulder 19 formed therein, upon which rests the thermostatic member 20, which is conveniently formed of a self-snapping thermostatic unit constructed in accordance with the prior United States Patent 1,448,240, March 13, 1923, the unit being automatically actuated by temperature changes over a predetermined range, the thermostatic member 20 being held in position upon the shoulder 19 by a ring 21, peripherally engaging the thermostat 20, so that the thermostat is free to snap in its center. The ring 21 is suitably secured in the head 17, as by threading. Behind the member 21 is a coiled spring 22, the spring bearing against the ring 21 and the cap 12, thus assuring a positive closing of the valve closing member 15 irrespective of the position of the housing 11.

Secured to the thermostat 20 is a valve member 23 adapted to seat over the opening of the passage 18 to effectively close the opening, the valve member 23 being lifted from its seat to open this passageway, when the thermostat snaps to the position shown in the dotted lines in Fig. 1. The face of the head 17 is provided with a port 24 communicating between the interior of the head and the fluid entrance chamber of the valve casing. Thermostat 20 also has one or more ports 25 communicating to the interior of the head 17. Spring 22 is strong enough to just overcome the weight of the main valve structure.

The operation of the valve will be understood from the following:

Fluid under pressure enters the valve in the direction of the arrow, and assuming that the valve members 15 and 23 are open, as in Fig. 3, it will flow through port 14 and then out through the valve casing. It will be understood that the thermostat 20 may be inserted either so that it will remain in the position of the dotted lines in Fig. 1, thus holding the valve members open until the temperature of the flowing fluid rises to snap the thermostat to close the valve members as shown in Fig. 1, thus shutting off the fluid from passing through the valve, or the valve members may be open while hot fluid passes through the valve, the thermostat closing upon a drop of temperature sufficient to snap the thermostat, thus preventing the fluid from becoming too hot or too cold for the desired purpose.

It will be noted that the area of the face 17a of the valve head is greater than the area of the face 26 of the valve closing member 15, and therefore, the pressure of the fluid exerted on the face 17a of the head as the fluid enters the valve casing will be proportionately greater than the pressure of the fluid on the face 26; and it will also be seen that the area of the passage 18 is greater than the area of the port 24. Therefore, when the valve members 15 and 23 are in the open position, fluid will pass through the port 14 and also through the ports 24 and 25 to the rear of the main valve head 17, issuing therefrom around the auxiliary valve member 23 and through the passage 18. Upon a change of temperature sufficient to snap the thermostat 20, this snapping will seat the auxiliary valve 23 to close the passage 18. The fluid will continue to enter to the rear of the main valve head through the ports 24 and 25 until the pressure behind the valve head 17 is equal to the pressure in the casing 10. Spring 22 then pushes against the ring 21, and this pressure transmitted to the main valve 15 seats this valve over the port 14 to close the port and stop the flow of fluid. The closing of the valve by the spring is greatly facilitated by the difference between the fluid pressure exerted on the valve head 17a and that exerted on the valve face 26.

Now, when the temperature of the fluid changes to snap the thermostat 20 in the position of the dotted lines in Figure 1, this snapping unseats valve 23, as shown in Figure 3, and opens the passage 18, thus permitting the fluid behind the valve head 17 in the housing 11 to flow out through the port 14; and since the area of the passage 18 is considerably greater than that of the port 24, the fluid behind the valve head 17 will flow out through the passage 18 considerably faster than it can be replaced through the flow through the port 24. Therefore, the pressure behind the head 17 will be less than the pressure exerted on the face 17a, and because of this difference in pressures together with the difference in the pressures exerted between faces 17a and 26, valve member 15 will be opened against the pressure of the spring 22, this spring being, as above mentioned, of a strength such as will just overcome the weight of the entire main valve structure. When the valve member 15 is unseated, fluid is free to pass through the port 14 until the thermostat 20 again snaps to seat the auxiliary valve member 23 and through this seating to seat the main valve 15 to stop the flow of fluid.

It will be seen that the main valve construction is similar to a piston assembly, the valve head 17 being the piston and the valve stem 16 corresponds to a piston rod.

As illustrated, the entire construction is shown as being cylindrical, and the shoulder 19 is accordingly an annular shoulder, the ring 21 being round in contour. The specific shape of the entire assembly is of no importance as long as the various parts are in proper relationship; and many other changes in the construction may be made and will be apparent to one skilled in this art, without departing from the inventive concept. It will accordingly be understood that it is intended and desired to embrace within the scope of this invention such modifications and changes as will adapt it to varying conditions and uses.

I claim:

1. A valve assembly comprising a hollow main valve with an open passage throughout its length, and a port adapted to admit fluid into the interior of the valve, the passage being substantially larger than the port, and an auxiliary thermostatically operated valve within the main valve adapted to open and close the passage.

2. A valve assembly comprising a main valve comprising an enlarged head forming a cup and stem and seating members, the closed end of the head carrying the stem and the seating member, the area of the said closed end being substantially greater than the area of the seating member, a passage extending completely through the seating member and stem and communicating with the interior of the head, a port through the closed end of the head adapted for fluid passage into and behind the head, the area of the said passage being substantially greater than the area of the port, and a thermostatically controlled auxiliary valve within the said head for opening and closing the said passage.

3. A valve structure comprising the combination with a partitioned casing having a fluid port, of a main valve adapted to control the port, the main valve comprising an enlarged hollow head adapted to receive fluid within and behind it, a passage through the main valve for discharging fluid therefrom, means for admitting fluid within and behind the said head, the area of the said passage being substantially greater than the total area of the said means, and a thermostatically controlled auxiliary valve within the said head adapted to open and close the said passage to control the operation of the main valve.

4. A valve structure comprising the combination with a casing having a partition therein dividing the casing into two compartments and a port through the partition communicating with the two compartments, of a main valve for controlling the port, the said valve comprising head, stem, and seating members, the said head being hollow and having an open end to form a fluid retaining cup, the closed end of which is exposed to pressure of fluid in one of the said compartments, the open end of the head slidably engaging a portion of the casing forming a housing therefor, the said head having means for admitting fluid to the interior thereof, the closed end of the head carrying the valve stem and seating member, the said stem and seating member having a continuous passage therethrough, the passage communicating from the interior of the head to the port in the partition, the area of the passage being substantially greater than the area of the fluid admitting means, and the area of the closed end of the head exposed to fluid in the compartment of the casing being substantially greater than the area of the seating member exposed to the fluid, and a snap-acting thermostat within the head, the said thermostat carrying an auxiliary valve adapted to seat upon the opening of the passage within the head to open and close the said passage, whereby upon opening the said passage, fluid from behind the said head flows through the said passage faster than fluid can enter behind the head, fluid pressure differences thus set up in front of and behind the head opening the said main valve.

In testimony whereof, I have signed my name to this specification this 29th day of May, 1930.

JOHN A. SPENCER.